US012593118B2

(12) United States Patent
Degen et al.

(10) Patent No.: US 12,593,118 B2
(45) Date of Patent: Mar. 31, 2026

(54) RECEIVER FOR A SYSTEM FOR TRANSMITTING LIGHT, SYSTEM FOR TRANSMITTING LIGHT, AND METHOD FOR OPERATING A SYSTEM FOR TRANSMITTING LIGHT

(71) Applicant: SEW-EURODRIVE GMBH & CO. KG, Bruchsal (DE)

(72) Inventors: Dirk Degen, Bruchsal (DE); Josef Schmidt, Graben-Neudorf (DE); Zhidong Hua, Bruchsal (DE); Thomas Schäfer, Karlsdorf-Neuthard (DE); Philipp Lehmann, Karlsruhe (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 244 days.

(21) Appl. No.: 17/913,588

(22) PCT Filed: Feb. 26, 2021

(86) PCT No.: PCT/EP2021/054800
§ 371 (c)(1),
(2) Date: Sep. 22, 2022

(87) PCT Pub. No.: WO2021/190856
PCT Pub. Date: Sep. 30, 2021

(65) Prior Publication Data
US 2023/0164412 A1     May 25, 2023

(30) Foreign Application Priority Data
Mar. 24, 2020     (DE) .......................... 102020001892.0

(51) Int. Cl.
| | |
|---|---|
| *H04N 23/55* | (2023.01) |
| *G06V 10/141* | (2022.01) |
| *H04N 25/74* | (2023.01) |

(52) U.S. Cl.
CPC ........... *H04N 23/55* (2023.01); *G06V 10/141* (2022.01); *H04N 25/74* (2023.01)

(58) Field of Classification Search
None
See application file for complete search history.

(56) References Cited

U.S. PATENT DOCUMENTS

| | | | |
|---|---|---|---|
| 7,555,217 B2 | 6/2009 | Hillis et al. | |
| 10,177,848 B1* | 1/2019 | Ramer ................. | H04B 10/116 |

(Continued)

FOREIGN PATENT DOCUMENTS

| | | |
|---|---|---|
| DE | 112006000484 T5 | 1/2008 |
| DE | 102018006988 B3 | 8/2019 |

(Continued)

OTHER PUBLICATIONS

English translation of JP-2004163447-A, Ito, Jun. 2004 (Year: 2004).*

(Continued)

*Primary Examiner* — James M Hannett

(74) *Attorney, Agent, or Firm* — Carter, DeLuca & Farrell LLP

(57) ABSTRACT

A receiver for a system for transmitting light, includes a camera having an image sensor, a light-sensitive area of the image sensor including a plurality of lines of light-sensitive elements, the image sensor being configured such that the light-sensitive area of the image sensor is scanned line by line or column by column, and an attachment element disposed such that light impinging on the light-sensitive area of the image sensor first passes through the attachment element. The attachment element includes strip-shaped, contoured regions and strip-shaped, planar regions. The contoured regions and the planar regions are disposed alternately in a transverse direction. The contoured regions have (Continued)

a constant cross section in an advance direction extending perpendicular to the transverse direction.

20 Claims, 4 Drawing Sheets

(56) References Cited

U.S. PATENT DOCUMENTS

| | | | | |
|---|---|---|---|---|
| 10,348,404 | B1 * | 7/2019 | Herman | H04B 10/0793 |
| 10,382,130 | B1 * | 8/2019 | Inskeep | H04N 23/55 |
| 11,349,568 | B2 | 5/2022 | Hua et al. | |
| 2004/0207104 | A1 | 10/2004 | Ono et al. | |
| 2018/0106600 | A1 * | 4/2018 | Greenspan | G01B 11/002 |

FOREIGN PATENT DOCUMENTS

| | | | | |
|---|---|---|---|---|
| DE | 102019123219 A1 * | 3/2020 | | B60R 1/00 |
| EP | 2940902 A1 | 11/2015 | | |
| FR | 3020533 A1 * | 10/2015 | | H01L 31/0468 |
| JP | 2004163447 A * | 6/2004 | | G06F 3/1423 |
| JP | 2004177923 A * | 6/2004 | | |
| WO | WO-2017006314 A1 * | 1/2017 | | G06K 19/06028 |

OTHER PUBLICATIONS

English translation of DE-102019123219-A1, Inskeep, Mar. 2020 (Year: 2020).*

English translation of WO-2017006314-A1, Yanson, Jan. 2017 (Year: 2017).*

English translation of FR-3020533-A1, Gilbert, Oct. 2015 (Year: 2015).*

English translation of JP-2004177923-A, Arisawa, Jun. 2004 (Year: 2004).*

International Search Report issued in corresponding International Application No. PCT/EP2021/054800 dated Jun. 7, 2021, pp. 1-2, English Translation.

Danakis, C. et al., "Using a CMOS camera Sensor for vsible light communication" 3rd IEEE Workshop on Optical Wireless Communication (Dec. 2012) pp. 1244-1248.

International Report on Patentability issued in corresponding International Application No. PCT/EP2021/054800 dated Sep. 22, 2022, pp. 1-7, English Translation.

* cited by examiner

RECEIVER FOR A SYSTEM FOR TRANSMITTING LIGHT, SYSTEM FOR TRANSMITTING LIGHT, AND METHOD FOR OPERATING A SYSTEM FOR TRANSMITTING LIGHT

FIELD OF THE INVENTION

The present invention relates to a receiver for a system for transmitting light, e.g., including a camera having an image sensor, a light-sensitive area of the image sensor including a plurality of lines of light-sensitive elements, the image sensor being configured such that the light-sensitive area of the image sensor is scanned line by line or column by column, and an attachment element disposed such that light impinging on the light-sensitive area of the image sensor first passes through the attachment element. The present invention further relates to a system for transmitting light, e.g., including a receiver and a transmitter. The present invention further relates to a method for operating a system for transmitting light.

BACKGROUND INFORMATION

A system and a method for transferring data by visible light are described in the article, "Using a CMOS Camera Sensor for Visible Light Communication", Danakis et. al., 978-1-4673-4941-3, IEEE. A camera of a smartphone serves as a receiver for visible light. The camera includes a CMOS image sensor, the light-sensitive area being scanned line by line. A light source in the form of an LED for emitting modulated light serves as the transmitter. By exploiting the rolling shutter effect of the CMOS image sensor, a data transfer rate exceeding the image frequency of the camera is achieved.

A system and a method for transferring data by visible light are also described in German Patent Document No. 10 2018 006 988. The system includes a receiver having an image sensor, the light-sensitive area thereof being scanned line by line, and a transmitter having a controlled luminous element for emitting modulated light. The receiver includes a lenticular film or a cylindrical lens array disposed between a lens of the receiver and the transmitter. An image projected onto the light-sensitive area of the image sensor is produced out of focus. By exploiting the rolling shutter effect of the image sensor, an increased data transfer rate is achieved.

An optical system having an optical antenna arrangement for providing lighting for an object is described in German Patent Document No. 11 2006 000 484. A second optical antenna element captures part of the light reflected by the object. The optical antenna arrangement can selectively illuminate spatial locations, and the receiving optical antenna arrangement can selectively receive light.

SUMMARY

Example embodiments of the present invention provide a receiver for a system for transmitting light, a corresponding system, and a method for operating the system.

According to an example embodiment of the present invention, a system for transmitting light includes a camera having an image sensor. A light-sensitive area of the image sensor includes a plurality of lines of light-sensitive elements. The image sensor is configured such that the light-sensitive area of the image sensor is scanned line by line or column by column. The receiver further includes an attachment element. The attachment element is configured such that light impinging on the light-sensitive area of the image sensor first passes through the attachment element.

The attachment element includes a plurality of strip-shaped, contoured regions and a plurality of strip-shaped, planar regions. The contoured regions and the planar regions are disposed alternately in a transverse direction. The contoured regions have a constant cross section in an advance direction extending perpendicular to the transverse direction.

Light passing through the contoured regions of the attachment element is relatively strongly refracted and generates a first image on the light-sensitive area of the image sensor. The first image generated on the image sensor of the camera is therefore an unfocused image. A light beam originating from a point light source is depicted in the form of a strip of light. When modulated light impinges, the strip of light is bright and dark in chronological sequence, depending on the modulation. By scanning the light-sensitive area of the image sensor line by line or column by column, the strip of light can thus include bright and dark regions depending on the modulation. A data stream according to which the light source emits modulated light can be detected from the bright and dark regions of the strip of light.

Light passing through the planar regions of the attachment element penetrates the attachment element at least approximately in a straight line and generates a second image on the light-sensitive area of the image sensor. The second image generated on the image sensor of the camera is therefore a focused, optical image.

Due to the configuration of the receiver, a data stream can be detected having a data transfer rate greater than an image frequency of the camera of the receiver. A focused, optical image can be detected from the second image. The receiver is thus suitable for rapidly transferring data and also for simultaneously recording focused, optical images. The attachment element can thereby be produced relatively simply and inexpensively.

According to example embodiments, the attachment element is arranged in the form of a film or in the form of a plate. The planar regions have a constant material thickness. The film or the plate is transparent.

According to example embodiments, the contoured regions include recesses and thus a lesser material thickness than the planar regions. The contoured regions are thus concave. It is provided that the refracting of an impinging light beam is not identical everywhere, but rather depends on the location of impinging. The attachment element can be produced, e.g., simply and inexpensively, in that the recesses are continuously milled out of a film or out of a plate in the advance direction.

According to example embodiments, the contoured regions include protrusions and thus a greater material thickness than the planar regions. The contoured regions are thus convex. It is provided that the refracting of an impinging light beam is not identical everywhere, but rather depends on the location of impinging.

According to example embodiments, the attachment element includes contoured regions having recesses and thus a lesser material thickness than the planar regions, and contoured regions having protrusions and thus a greater material thickness than the planar regions.

According to example embodiments, the contoured regions have an at least approximately semicircular cross section.

According to example embodiments, an extent in the transverse direction of one of the planar regions is greater than an extent in the transverse direction of one of the contoured regions. An extent in the transverse direction of each of the planar regions is, e.g., greater than an extent in the transverse direction of each of the contoured regions.

The extent in the transverse direction of one of the planar regions is, e.g., twice the size of the extent in the transverse direction of one of the contoured regions. The extent in the transverse direction of one of the planar regions is, e.g., no greater than ten times the size of the extent in the transverse direction of one of the contoured regions. The extent in the transverse direction of each of the planar regions is, e.g., at least twice the size of the extent in the transverse direction of each of the contoured regions. The extent in the transverse direction of each of the planar regions is, e.g., no greater than ten times the size of the extent in the transverse direction of each of the contoured regions.

According to example embodiments, the receiver further includes a receiving unit. The receiving unit includes a first receiving element and a second receiving element displaceable relative to the first receiving element. The camera is received in the first receiving element, and the attachment element is received in the second receiving element. The attachment element is displaceable relative to the camera, for example, pivotable or displaceable.

A system according to an example embodiment of the present invention for transmitting light includes a receiver and a transmitter including at least one controlled light source. The at least one light source of the transmitter emits light modulated according to a specified data stream.

According to example embodiments, the attachment element of the receiver is disposed between the at least one controlled light source of the transmitter and the camera of the receiver. It is thus provided that light impinging on the light-sensitive area of the image sensor of the camera previously passes through the attachment element.

In a method according to an example embodiment of the present invention for operating a system for transmitting light, the light-sensitive area of the image sensor is scanned line-by-line or column-by-column. A first image projected onto the light-sensitive area by the contoured regions of the attachment element is processed separately from a second image projected onto the light-sensitive area by the planar regions of the attachment element.

According to example embodiments, the data stream is detected from the first image, according to which the at least one controlled light source of the transmitter emits modulated light. The data transfer rate of the data stream is, e.g., greater than an image frequency of the camera of the receiver.

According to example embodiments, an optical image is detected from the second image. The second image is, e.g., a focused, optical image.

By use of the method, various information can be transmitted from the transmitter to the receiver and recorded by the receiver simultaneously by the first image and of the second image. For example, coordinates can be encoded in the data stream. By evaluating the data stream detected from the first image, positioning is possible. By evaluating the second image, for example, a QR code can be scanned.

Further features and aspects of example embodiments of the present invention are described in greater detail below with reference to the appended schematic Figures.

DETAILED DESCRIPTION

Figure 1:
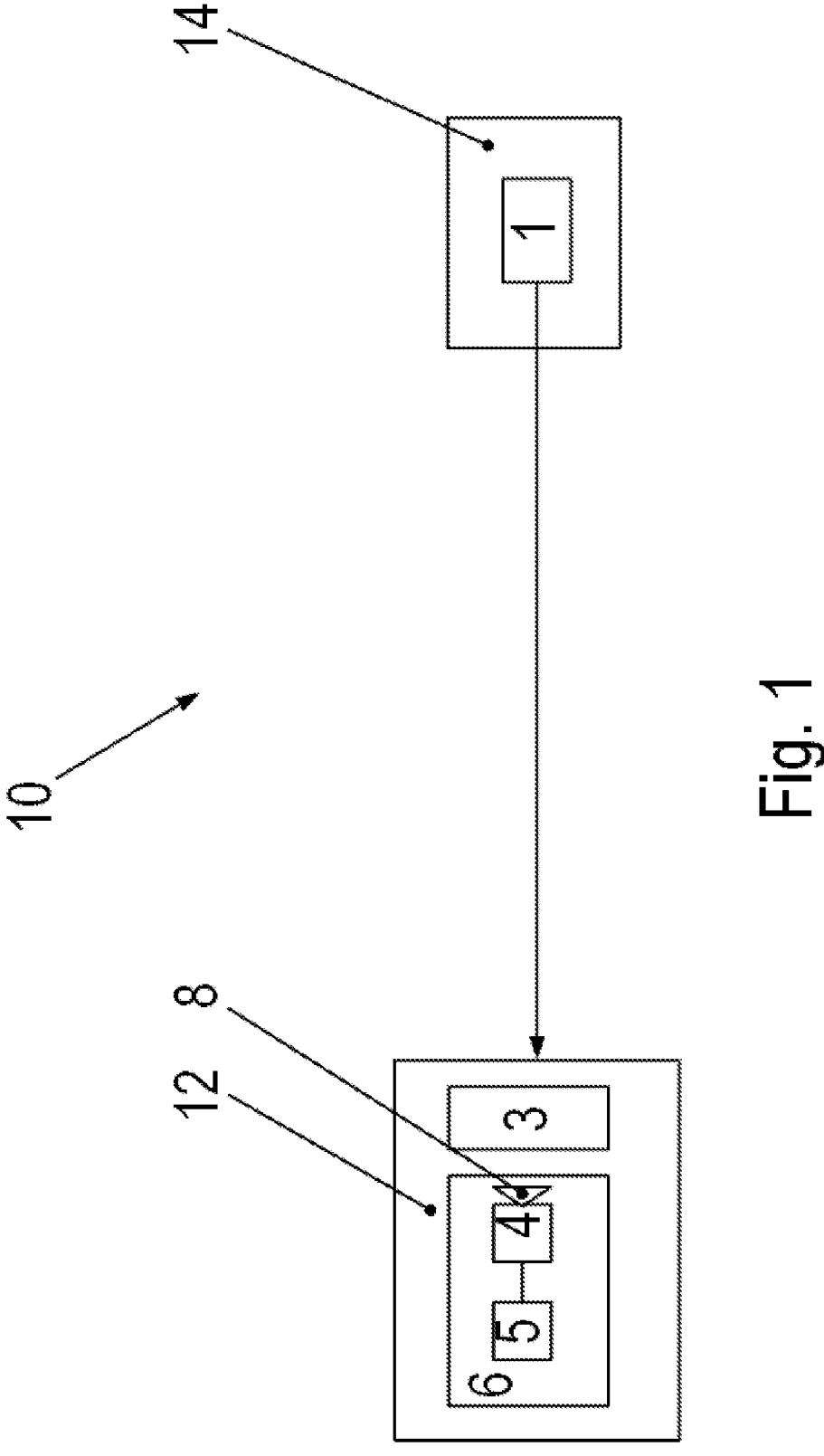
FIG. 1 schematically illustrates a system for transmitting light.

FIG. 1 schematically illustrates a system 10 for transmitting light. The system 10 for transmitting light includes a transmitter 14 having a controlled light source 1. The light source 1 is an LED, a ceiling lamp, or a headlight of a vehicle, for example. The system 10 for transmitting light further includes a receiver 12.

The receiver 12 includes a camera 6. The camera 6 includes an image sensor 4. The image sensor 4 includes a light-sensitive area including a plurality of lines and columns of light-sensitive elements. When operating the camera 6, the light-sensitive area of the image sensor 4 is scanned line by line or column by column. The individually scanned lines are combined into an overall image. The camera 6 further includes an optical element in the form of an optical lens 8. The lens 8 is disposed in front of the image sensor 4, so that light impinging on the light-sensitive area of the image sensor 4 previously passes through the lens 8. The camera 6 also includes signal electronics 5 for scanning the light-sensitive area of the image sensor 4.

The receiver 12 further includes an attachment element 3. The attachment element 3 is disposed in front of the image sensor 4 such that light impinging on the light-sensitive area of the image sensor 4 first passes through the attachment element 3. The attachment element 3 is implemented in the form of a relatively thin, transparent film. The attachment element 3 is disposed between the light source 1 of the transmitter 14 and the camera 6.

The camera 6 of the receiver 12 is part of a commercial mobile phone or smart phone. The receiver 12 optionally also includes a receiving unit. The receiving unit is a case, for example, including a first receiving element and a second receiving element. The second receiving element is displaceable, e.g., pivotable, relative to the first receiving element. The mobile phone having the camera 6 is received in the first receiving element, and the attachment element 3 is received in the second receiving element. The attachment element 3 is displaceable, e.g., pivotable, relative to the camera 6. If no data transfer by the system 10 is desired, the attachment element 3 can be removed from the camera 6 and the camera can record a complete optical image without the attachment element 3.

Figure 2:
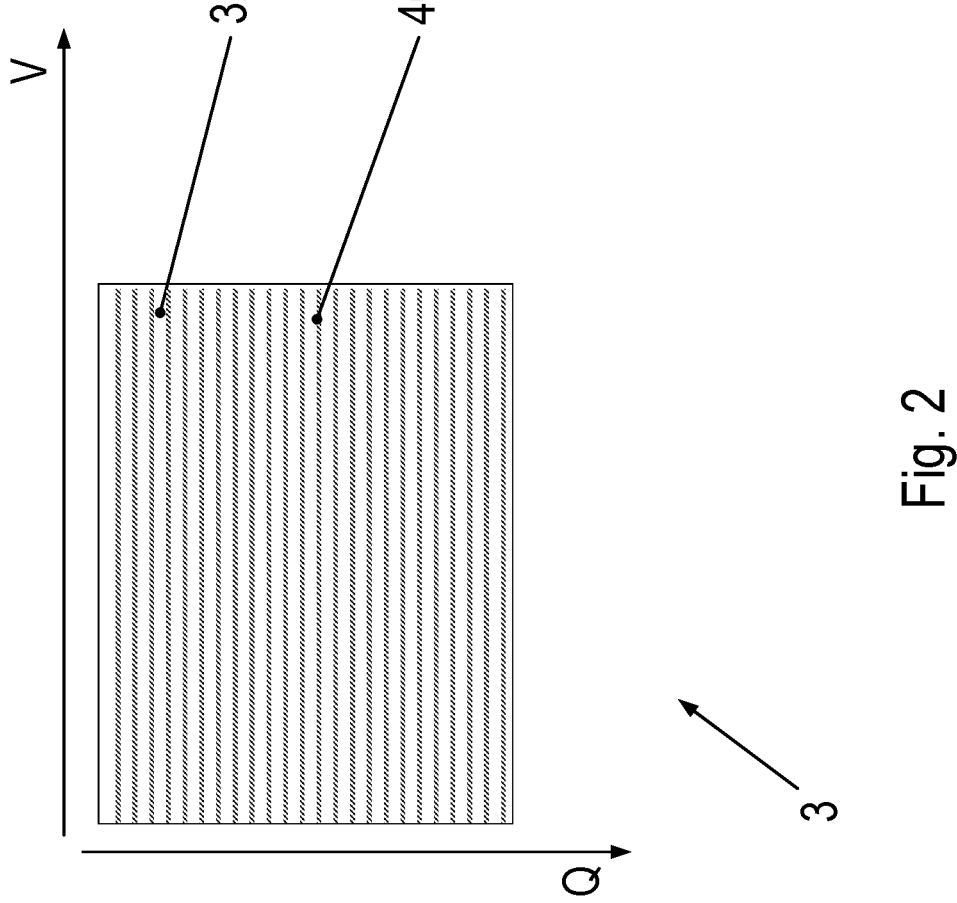
FIG. 2 is a plan view of an attachment element.

FIG. 2 is a plan view of an attachment element 3. The attachment element 3 includes a plurality of strip-shaped, contoured regions 40 and a plurality of strip-shaped, planar regions 32. The contoured regions 40 and the planar regions 32 are disposed alternately in a transverse direction Q and parallel to an advance direction V. The advance direction V extends perpendicular to the transverse direction Q.

The strip-shaped, contoured regions 40 of the attachment element 3 are implemented such that light passing through the profiled regions 40 is refracted relatively severely. A light beam 60 originating from a point light source 1 is, e.g., depicted in the form of a strip of light 50 extending in the transverse direction Q. Light passing through the contoured regions 40 of the attachment element 3 generates a first image on the light-sensitive area of the image sensor 4. The first image is unfocused due to the relatively severe refracting of the light.

The planar regions 32 of the attachment element 3 are implemented such that light passing through the planar regions 32 penetrates the attachment element 3 at least approximately in a straight line, e.g., not refracted or only negligibly refracted. Light passing through the contoured regions 32 of the attachment element 3 generates a second image on the light-sensitive area of the image sensor 4. The second image is a focused, optical image.

Figure 3:
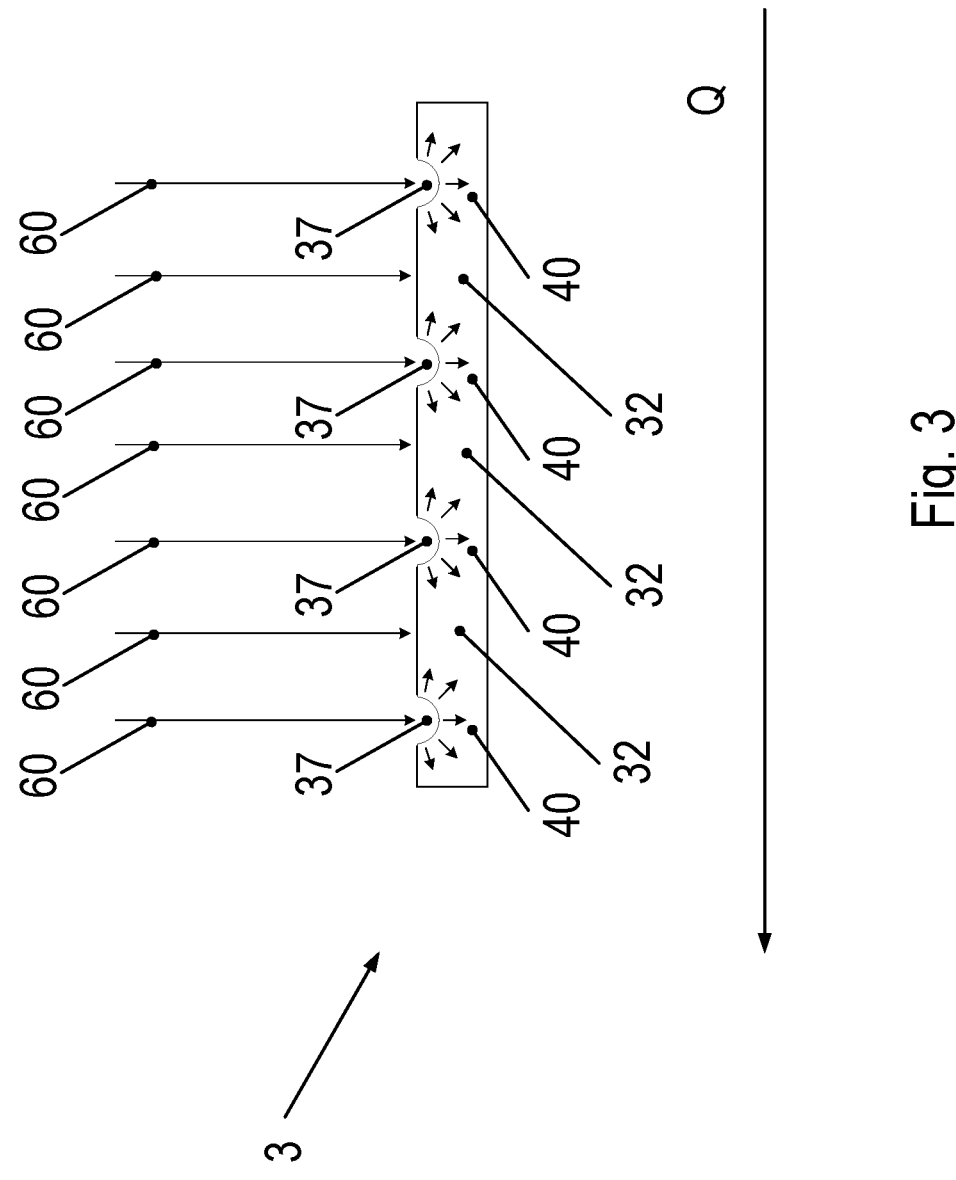
FIG. 3 is a cross-sectional view through the attachment element.

FIG. 3 is a cross-sectional view through the attachment element 3 illustrated in FIG. 2. The cross-sectional plane extends through the attachment element 3 in the transverse direction Q and perpendicular to the advance direction V. The contoured regions 40 and the planar regions 32, as previously mentioned, are disposed alternately in the transverse direction Q.

The planar regions 32 of the attachment element 3 have an at least approximately constant material thickness. The material thickness is an extent of the film in a direction perpendicular to the advance directly V and perpendicular to the transverse direction Q. Light beams 60 thus penetrate the planar regions 32 at least approximately in a straight line and are not refracted or only negligibly refracted.

The contoured regions 40 of the attachment element 3 include recesses 37 and are thus concave. The contoured regions 40 thus have a lesser material thickness than the planar regions 32. The contoured regions 40 continuously have a constant cross section in the advance direction V. The contoured regions 40 have an approximately semicircular cross section. Light beams 60 impinging on the contoured regions 40 are thus refracted at different severity in the transverse direction Q depending on the location of impinging.

It is also possible that the contoured regions 40 of the attachment element 3 include protrusions and are thus convex. For example, the contoured regions 40 have a greater material thickness than the planar regions 32. The cross section of the contoured regions 40 can also deviate from the semicircular shape.

An extent of the individual planar regions 32 in the transverse direction Y is greater than an extent of the individual contoured regions 40 in the transverse direction Y. For example, the extent of the individual planar regions 32 in the transverse direction Y is approximately 4 μm, and the extent of the individual contoured regions 40 in the transverse direction Y is approximately 2 μm. The extent of the individual planar regions 32 in the transverse direction Y is thus approximately three times the size as the extent of the individual contoured regions 40 in the transverse direction Y. The extent of the individual planar regions 32 in the transverse direction Y and the extent of the individual contoured regions 40 in the transverse direction Y should be less than 1 mm.

Figure 4:
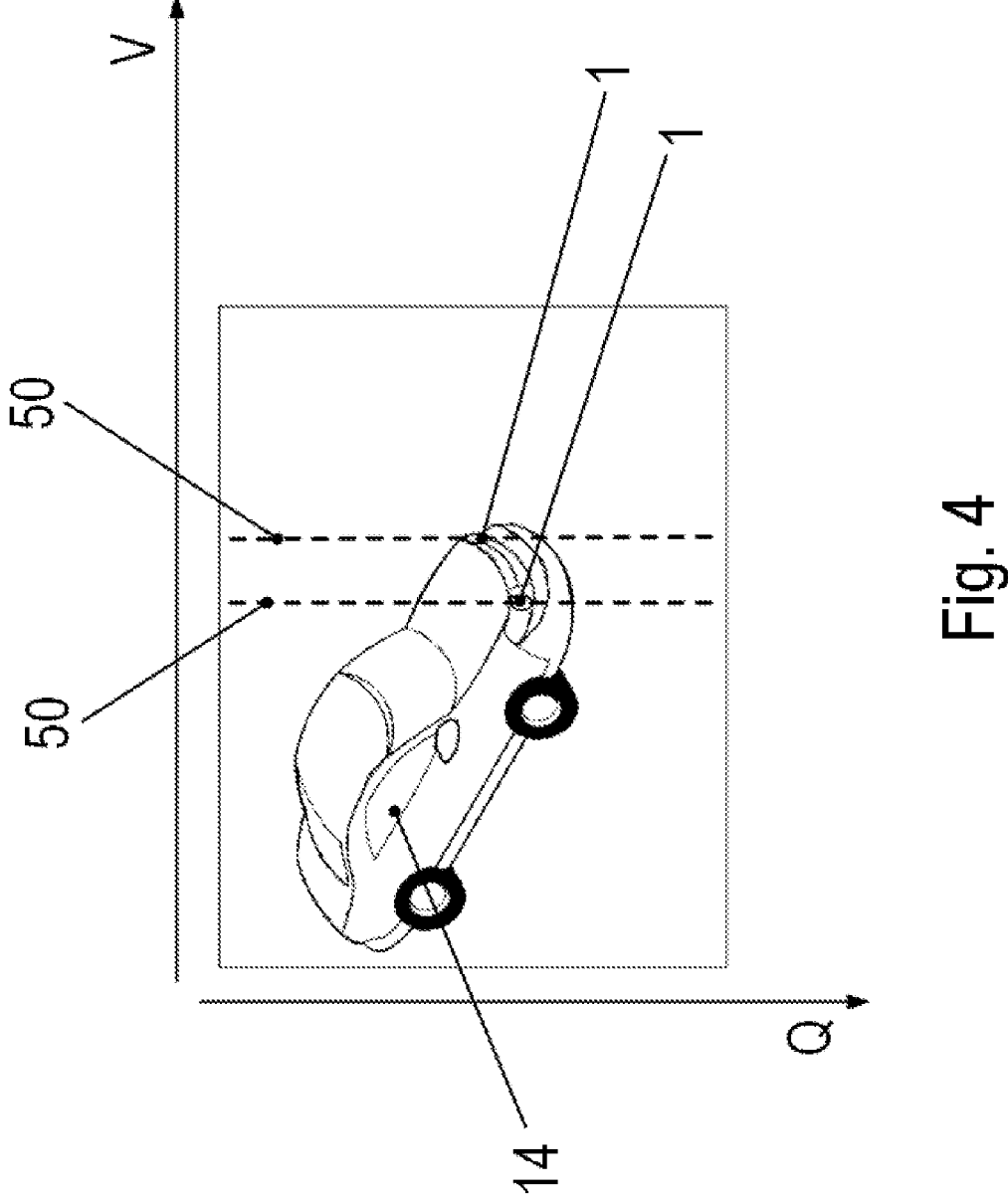
FIG. 4 illustrates an overall image projected through the attachment element.

FIG. 4 illustrates an overall image projected by the attachment element 3 illustrated in FIG. 2 and FIG. 3. For example, the transmitter 14 generating the overall image is a motor vehicle. The motor vehicle includes two light sources 1 implemented as headlights. The two light sources 1 can be considered approximately as points.

The overall image includes a first image generated by light passing through the contoured regions 40 of the attachment element 3. The overall image also includes a second image generated by light passing through the planar regions 32 of the attachment element 3.

The light emitted by one of the light sources 1 and impinging on a part of a contoured region 40 of the attachment element 3 is refracted and depicted in the form of a strip of light 50. The strips of light 50 produced by the two light sources 1 thereby extend in the transverse direction Q.

The light emitted by the other parts of the transmitter 14 impinging perpendicularly on a planar region 32 of the attachment element 3 penetrates the attachment element 3 at least approximately in a straight line. A second image is thereby produced. The second image is thereby a focused, optical image.

The second image also depicts relatively thin strips having reduced brightness and extending in the advance direction V. The strips are generated by parts of the contoured regions 40 of the attachment element 3 on which no light from the light sources 1 impinges. The strips are, however, relatively thin and therefore hardly visible in the overall image. The transmitter 14, e.g., a motor vehicle, is thus clearly recognizable in the overall image.

LIST OF REFERENCE CHARACTERS

1 Light source
3 Attachment element
4 Image sensor
5 Signal electronics
6 Camera
8 Lens
10 System
12 Receiver
14 Transmitter
32 Planar region
37 Recess
40 Contoured region
50 Fluorescent strips
60 Light beam
Q Transverse direction
V Advance direction

The invention claimed is:

1. A receiver for a system for transmitting light, comprising
  a camera including an image sensor, a light-sensitive area of the image sensor including a plurality of lines of light-sensitive elements, the image sensor adapted to scan the light-sensitive area line by line and/or column by column; and
  an attachment element arranged such that light impinging on the light-sensitive area of the image sensor first passes through the attachment element, the attachment element including a plurality of strip-shaped, contoured regions and a plurality of strip-shaped, planar regions;
  wherein the contoured regions and the planar regions are arranged alternately in a transverse direction; and
  wherein the contoured regions have a constant cross-section in an advance direction extending perpendicular to the transverse direction.

2. The receiver according to claim 1, wherein the attachment element is arranged as a film and/or a plate, and the planar regions have a constant material thickness.

3. The receiver according to claim 2, wherein the contoured regions include recesses and a lesser material thickness than the planar regions.

4. The receiver according to claim 2, wherein the contoured regions include protrusions and a greater material thickness than the planar regions.

5. The receiver according to claim 2, wherein at least one of the contoured regions includes recesses and a lesser material thickness than the planar regions, and at least one of the contoured regions include protrusions and a greater material thickness than the planar regions.

6. The receiver according to claim 1, wherein the contoured regions have an at least approximately semi-circular cross-section.

7. The receiver according to claim 1, wherein the contoured regions have a semi-circular cross-section.

8. The receiver according to claim 1, wherein an extent of one of the planar regions is greater in the transverse direction than an extent of one of the contoured regions in the transverse direction.

9. The receiver according to claim 1, wherein an extent in the transverse direction of one of the planar regions is at least double the size of an extent in the transverse direction of one of the contoured regions, and/or the extent in the transverse direction of one of the planar regions is no greater than ten times the size of the extent in the transverse direction of one of the contoured regions.

10. The receiver according to claim 1, further comprising a receiving unit including a first receiving element and a second receiving element displaceable relative to the first receiving element, wherein the camera is arranged in the first receiving element, and the attachment element is arranged in the second receiving element.

11. The receiver according to claim 1, wherein an extent in the transverse direction of one of the planar regions is at least double the size of an extent in the transverse direction of one of the contoured regions.

12. The receiver according to claim 1, wherein the extent in the transverse direction of one of the planar regions is no greater than ten times the size of the extent in the transverse direction of one of the contoured regions.

13. The receiver according to claim 11, wherein the extent in the transverse direction of one of the planar regions is no greater than ten times the size of the extent in the transverse direction of one of the contoured regions.

14. A system for transmitting light, comprising:
a receiver, including:
a camera including an image sensor, a light-sensitive area of the image sensor including a plurality of lines of light-sensitive elements, the image sensor adapted to scan the light-sensitive area line by line and/or column by column; and an attachment element arranged such that light impinging on the light-sensitive area of the image sensor first passes through the attachment element, the attachment element including a plurality of strip-shaped, contoured regions and a plurality of strip-shaped, planar regions; and
a transmitter including at least one controllable light source adapted to emit light modulated according to a specified data stream;
wherein the contoured regions and the planar regions are arranged alternately in a transverse direction; and
wherein the contoured regions have a constant cross-section in an advance direction extending perpendicular to the transverse direction.

15. The system according to claim 14, wherein the attachment element is arranged between the light source and the camera.

16. A method for operating the system recited in claim 14, comprising:
scanning line-by-line and/or column-by-column the light-sensitive area of the image sensor; and
processing a first image projected onto the light-sensitive area by the contoured regions of the attachment element separately from a second image projected onto the light-sensitive area by the planar regions of the attachment element.

17. The method according to claim 16, further comprising detecting the data stream from the first image, according to which the light source of the transmitter emits modulated light.

18. The method according to claim 16, further comprising detecting an optical image from the second image.

19. The receiver according to claim 1, wherein the contoured regions and the planar regions are arranged alternately in the transverse direction on a same side of the attachment element.

20. The system according to claim 14, wherein the contoured regions and the planar regions are arranged alternately in the transverse direction on a same side of the attachment element.

* * * * *